United States Patent [19]
Maenicke

[11] 3,967,189
[45] June 29, 1976

[54] POWER SUPPLY FOR ELECTRONIC CIRCUITS AT HIGH-VOLTAGE POTENTIAL

[75] Inventor: Eckart Maenicke, Berlin, Germany

[73] Assignee: Siemens Aktiengesellschaft, Munich, Germany

[22] Filed: Sept. 15, 1972

[21] Appl. No.: 289,622

[30] Foreign Application Priority Data

Sept. 16, 1971 Germany............................ 2146772

[52] U.S. Cl. .................................. 323/76; 323/77; 323/79; 324/127
[51] Int. Cl.² ......................................... H02J 13/00
[58] Field of Search......... 307/109; 317/12 A, 12 B; 323/44 R, 76, 77, 79; 324/126, 127

[56] References Cited
UNITED STATES PATENTS

| | | | |
|---|---|---|---|
| 1,876,427 | 9/1932 | Lennox .............................. | 323/76 X |
| 1,985,634 | 12/1934 | Fleming ............................ | 323/77 X |
| 2,005,147 | 6/1935 | Langguth et al. ................ | 307/109 X |
| 2,139,232 | 12/1938 | Hysko ............................... | 323/79 X |
| 2,341,519 | 2/1944 | Atkinson .......................... | 307/109 X |
| 2,613,345 | 10/1952 | Osterland ......................... | 324/126 X |
| 2,756,414 | 7/1956 | Doremus .......................... | 324/126 X |
| 3,460,042 | 8/1969 | Harner ............................. | 324/127 UX |
| 3,654,483 | 4/1972 | Lenehan ........................... | 323/44 R |

*Primary Examiner*—A. D. Pellinen
*Attorney, Agent, or Firm*—Kenyon & Kenyon Reilly Carr & Chapin

[57] ABSTRACT

A power supply apparatus supplies power from a low-voltage potential to an electronic circuit at a high-voltage potential such as an electronic circuit for detecting the current in high-voltage conductors and the like. The electronic circuit is connected to an associated transformer for receiving electric energy. The apparatus includes a power oscillator connected to the low-voltage potential which in turn has an output transformer. A current path is provided for conducting electric power from the output transformer of the oscillator at low-voltage potential to the associated transformer connected to the electronic circuit at high-voltage potential. A power source means supplies electric power to the power oscillator independently of the value of the electrical energy at the high-voltage potential.

14 Claims, 7 Drawing Figures

POWER SUPPLY FOR ELECTRONIC CIRCUITS AT HIGH-VOLTAGE POTENTIAL

BACKGROUND OF THE INVENTION

The invention relates to a power supply apparatus for electronic circuits operated at high-voltage potential. More particularly, the invention relates to such an apparatus which supplies power to such circuits independently of the electrical conditions on the high-voltage end.

Supplying electronic circuits at high potential with power presents considerable difficulties because a large potential difference must usually be bridged to supply operational power from the low potential side.

If the potential difference is in the order of up to about 110 kV, current transformers can be used at a cost which is still justifiable to assure the supply of power to electronic circuits arranged at high-voltage potential. For potential differences above 110 kV, the use of current transformers is no longer advisable for physical and cost reasons.

It is known from U.S. Pat. No. 52,477 of the German Democratic Republic to use power sources such as storage batteries or diesel engine units for supplying power to electronic circuits at high-voltage potential; these power sources were arranged at high-voltage potential. However, this type of power supply has not found acceptance for reasons of reliability and maintenance.

According to this reference an insulating mechanical shaft or an insulating belt has been used for transmitting energy from the low-voltage to the high-voltage side. The belt or shaft was moved by a motor located at low-voltage potential and a generator located at high potential is driven by the shaft or the belt and generates the current required for the power supply. These known power supplies are relatively expensive and not very reliable.

In view of the foregoing and as disclosed in the German patent, a pressure medium, particularly compressed air, has been used as the energy source at ground potential. The pressure medium activates a pressure-medium drive of a generator delivering a high-voltage potential. The compressed air is fed through insulating tubes or insulating hoses. This power supply too is very costly and also not very reliable because of the many individual parts required. Such a power supply is unsuited for devices which serve, for example for obtaining measured quantities needed for system protection equipment.

The publication Electronics of May 17, 1965, page 73 describes using a saturated current transformer for supplying current to electronic circuits at high-voltage potential; this assures an adequate power supply under normal operating conditions. In addition, it presupposes that at the high-voltage potential, for example in a high-voltage conductor, a sufficiently large current flows. If the voltage becomes very small or fails altogether, power can no longer be supplied by means of the saturated current transformer. Electronic circuits at high-voltage potential which measure, for example, the current flowing there, will then no longer furnish measured values. From the absence of a measured value it should not, however, be concluded that the current value is zero, because this may also occur with small currents in the event of a power supply failure. Connected protective devices therefore no longer receive an unambiguous signal in that case, so that it is possible that a section of line which should be disconnected, is not disconnected, or an unnecessary disconnect action is carried out.

According to the above-mentioned edition of Electronics, the current supply equipment is provided additionally with a current path from the high-voltage side to the low-voltage side. The current path consists of a series connection of a winding of a transformer and a voltage divider. A current sufficient to supply power to the electronic circuits at high-voltage potential is taken from the hhgh-voltage line through the transformer. The arrangement of the series circuit consisting of the transformer and the voltage divider is not advantageous, particularly because the voltage divider is of relatively complicated configuration and is trouble-prone. Furthermore, the power consumption is relatively high and excessive temperature develops in the voltage divider. A particular disadvantage of this known arrangement is that a failure of the high voltage is accompanied by a failure of the power supply for the electronic circuits.

A further disadvantage of the known arrangement is that the current through the current path is no longer proportional to the conductor voltage because of the non-linear voltage drop at the power supply.

SUMMARY OF THE INVENTION

It is an object of the invention, to provide a power supply apparatus for electronic circuits at high-voltage potential. Subsidiary to this object and in view of the disadvantages referred to above, it is an object of the invention to provide such a power supply apparatus which supplies power to the electronic circuits independently of the electrical conditions on the high-voltage end.

The power supply apparatus of the invention supplies power from a low-voltage potential to an electronic circuit at a high-voltage potential such as electronic circuit for detecting the current in high-voltage conductors and the like. The electronic circuit is connected to an associated transformer for receiving electric energy.

According to a feature of the power supply, a power oscillator is disposed at the low-voltage potential and has an output transformer and current path means wich conducts electric power from the output transformer of the oscillator at low-voltage potential to the associated transformer connected to the electronic circuit at high-voltage potential. According to still another feature, power source means supplies electric power to the power oscillator independently of the value of the electrical energy at the high-voltage potential.

The current path means can include an input winding which forms part of the input transformer connected to the eleronic circuit, an impedance arrangement serially connected to this input winding, and an output winding which forms part of the output transformer of the power oscillator. The output winding is connected to the serial combination of the input winding and the impedance arrangement. Regardless of the state of energization at the high-voltage potential, a current can be supplied continuously by the power oscillator to the high-voltage side via the current path, so that the supply of power for electronic circuits located there is assured in any eventuality.

The power oscillator of the power supply apparatus of the invention generates advantageously a current with a frequency of several tens of kilohertz. It is sought here to have the frequency as high as possible in view of the phase error at 50 Hz, but lower than 75 kHz in view of the interference with and by carrier frequency systems for communication transmission.

As an alternate embodiment, the associated transformer can constitute part of the power supply apparatus. The associated transformer is then connectable to the electronic circuit and is disposed at high-voltage potential. The associated transformer has a primary winding and a secondary winding which is connectable to the electronic circuit. The current path means then includes the primary winding of the associated transformer, an impedance arrangement serially connected to the primary winding of the associated transformer and the secondary winding of the output transformer of the power oscillator.

It is particularly advantageous if, in the power supply apparatus according to the invention, the impedance arrangement connected in the current path is constituted by a capacitor arranged between the associated transformer of the power supply apparatus and the output transformer of the power oscillator. In a power supply configured in this manner, the complicated and trouble-prone voltage divider of known power supplies becomes unnecessary, and a reduction of the power consumption by about 9/10 is achieved as compared to power supplies with a voltage divider.

According to another feature of the invention, it is advantageous to form a capacitive divider by providing an additional capacitor in the current path between the high-voltage potential and low-voltage potential. The additional capacitor is the low-potential capacitor and is additional to the one capacitor discussed above which can be viewed as the upper potential capacitor. The upper potential capacitor and the lower potential capacitor define the capacitive divider. A voltage measuring device with a measuring amplifier can then be connected to the low-potential capacitor. In this connection, reference may be had to the German journal Elektrotechnische Zietschrift-Ausgabe A 88 (1967), No. 13, page 309.

Alternative to the above capacitive divider, the power supply according to the invention can be equipped with a capacitive divider consisting of a high-potential and a low-potential capacitor arranged parallel to the current path between the high-voltage potential and the low-voltage potential. This capacitive divider would then be connected parallel to the current path comprising the transformer, the capacitor between the high-voltage potential and the low-voltage potential, and the secondary winding of the output transformer of the power oscillator. The advantage of a power supply configured in this manner is that the capacity between the high-voltage potential, particularly a high-voltage conductor, and ground can be as small as desired at the point of measurement, for example, smaller than 100 pF. With this arrangement of an additional capacitive divider, the high-frequency current from the power oscillator need not flow through the conductor to ground capacitance, but instead can flow through the divider capacitors.

In a power supply with an additional capacitive divider, a voltage measuring device with a measuring amplifier can be connected at the low-potential capacitor to obtain a voltage proportional to the high voltage.

As it is not required in every case to obtain a voltage proportional to the high voltage by means of the low-potential capacitor, it is advantageous if the terminals for the low-potential capacitor disposed in the current path between the high-voltage potential and the low-voltage potential are arranged so that they are accessible from the outside of the unit containing the low-potential capacitor. If a voltage measurement is not considered necessary, these terminals can simply be short-circuited, so that the power supply according to the invention simply provides only an adequate supply of power to the electronic circuits at high-voltage potential. If on the other hand, a low-potential capacitor with a voltage measuring device in cascade therewith is connected to the terminals, the power supply according to the invention makes a voltage measurement possible, this being in addition to supplying power to electronic circuits at high-voltage potential.

It is further considered advantageous if in the power supply according to the invention, a circuit unit is arranged in the output circuit of the power oscillator for monitoring the limit value of the generated current, the circuit unit generating a signal if the current required for supplying the electronic circuits at high-voltage potential drops below a minimum value. This signal may, for example be of an optical or acoustical nature for attracting the attention of the operating personnel to the power supply. However, the signal can also be used, for example, to switch over from a storage battery connected for supplying the power oscillator to another storage battery.

It is further advantageous to arrange a limit-value stage in the current path between the high-voltage potential and the low-voltage potential which transmits a signal for disconnecting the power oscillator supplying power at the time in the event that the minimum value of the current in the current path required to supply the electronic circuit at high-voltage potential is exceeded. With a power supply configured in this manner, power is taken from the power oscillator only when this is necessary. This is then the situation if current no longer flows from the high-voltage side through the current path which is sufficient to supply the electronic circuits at high-voltage potential with power. By switching the power oscillator on only when required, its power source means in the form of a storage battery is used relatively little.

The power supply according to the invention further affords the advantage of combining the power supply with the electronic circuits at high-voltage potential to form a structural unit. The structural unit can also include the capacitors. If the electronic circuits at high-voltage potential are electronic circuits for measuring the current in high-voltage conductors, a current and voltage transformer is obtained which produces a measurement quantity proportional to the current in the high-voltage conductor and a further measurement quantity proportional to the high voltage.

Although the invention is illustrated and described herein as a power supply for electronic circuits at high-voltage potential, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS

Figure 1:
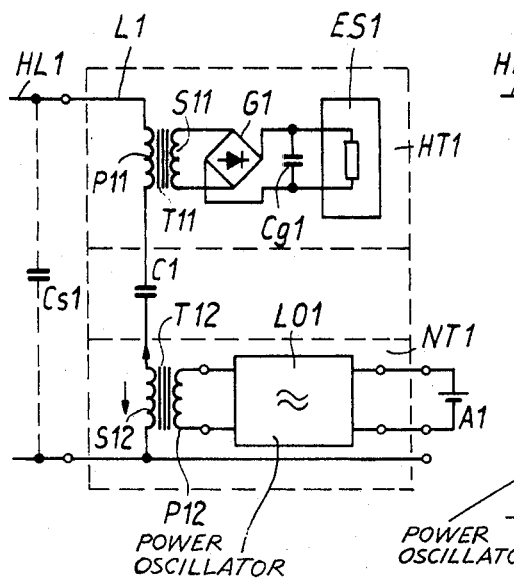
FIG. 1 is a schematic diagram of the power supply apparatus according to the invention wherein a capacitor is disposed intermediate the high-voltage potential side and the low-voltage potential side. The apparatus supplies power to an electronic circuit at high-voltage potential.

Referring now to FIG. 1, a high-voltage unit HT1 is connected through a capacitor C1 with a low-voltage unit NT1. The high-voltage unit HT1 is at the potential of a high-voltage line HL1 and is connected with the line HL1 through a line L1. A current path between the high-voltage potential and the low-voltage potential is formed by this line L1, a primary winding P11 of an associated transformer T11, and impedance arrangement in the form of a capacitor C1 and a secondary winding S12 of an output transformer T12 arranged in the low-voltage unit NT1. A current is taken from the current path via the transformer T11 and is fed via a secondary winding S11 of the transformer T11, a succeeding rectifier G1 and a filter capacitor Cg1 to an electronic circuit ES1, which is represented schematically as an impedance.

The low-voltage unit NT1 includes a power oscillator L01 which feeds a high-frequency current, for example having a frequency of 40 kHz, into the current path via a primary winding P12 of the output transformer T12. The high-frequency current of the power oscillator L01 flows back through the capacitor C1, the primary winding P11 of the transformer T11, and through the capacitance Cs1 between the high-voltage conductor HL1 and earth. This current supplies power to the electronic circuit ES1. Because the power oscillator L01 is fed from a storage battery A1 which is not influenced by the state of energization at high-voltage potential, it is assured that the power supply for electronic circuit ES1 at high-voltage potential is also not influenced by the state of energization of the high-voltage conductor HL1. This means that the power supply in the high-voltage unit HL1 is assured even when the current in the high-voltage conductor HL1 becomes zero or the high voltage breaks down.

Figure 2:
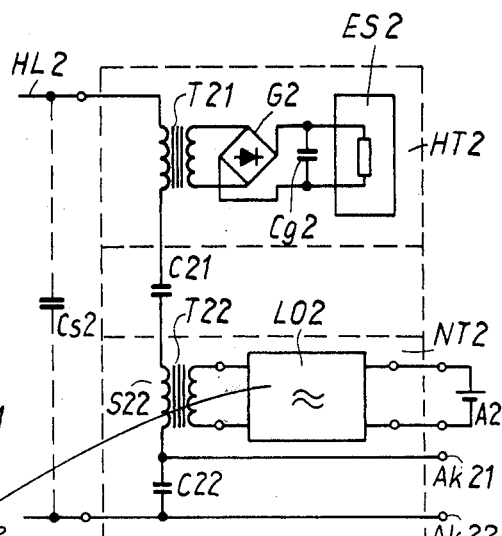
FIG. 2 is another embodiment of the invention wherein an additional capacitor is provided to form a capacitive divider with the capacitor disposed as in FIG. 1.

The power supply shown in FIG. 2 is an embodiment alternate to that shown in FIG. 1. The embodiment of FIG. 2 differs by providing the feature of an additional capacitor C22. Thus, in addition to a capacitor C21 between the high-voltage unit HT2 and the low-voltage unit NT2, an additional capacitor C22 is provided. The capacitor C22 constitutes the low-potential capacitor in a capacitive voltage divider formed by the capacitors C21 and C22. The capacitor C21 can then be viewed as an upper potential capacitor and is connected, together with the primary winding of transformer T21, the capacitor C22 and the secondary winding S22 of the output transformer T22 in a current path which extends between a high-voltage conductor HL2 and the low-voltage potential. The power oscillator L02 is fed on the low-voltage potential side from a storage battery A2 and delivers a high-frequency current through the output transformer T22 to the current path. The current path in turn supplies an electronic circuit ES2 through the transformer T21, a rectifier G2 and a filter capacitor Cg2. The supplied current flows off through the capacitance Cs2 between the high-voltage conductor HL2 and the low-voltage potential.

The embodiment of the power supply according to the invention shown in FIG. 2 can be configured to form a structural unit which can, for example, be accommodated in a conventional insulator; this is true also for the embodiment according to FIG. 1. The structural unit is constructed so that at the terminals Ak21 and Ak22, a voltage measuring device with a measuring amplifier in cascade can be connected at a later time if desired. The power supply according to the invention can then be used at the same time for measuring the high voltage.

Figure 2A:
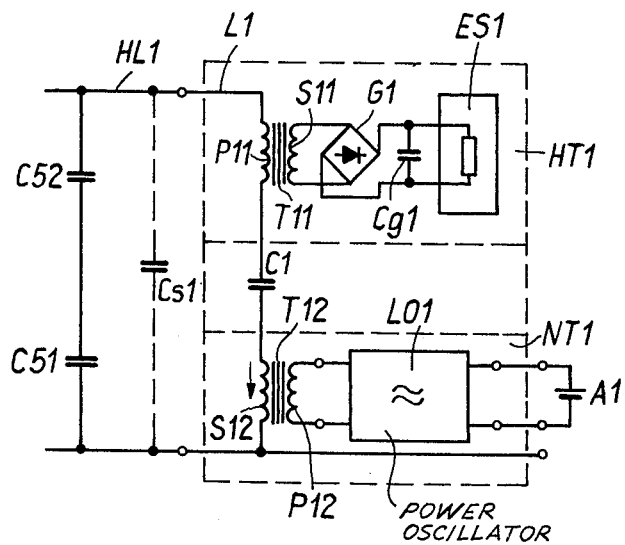
FIG. 2A is an embodiment of the invention wherein the capacitive divider is connected in parallel with the current path supplying power to the electronic equipment at high-voltage potential.

Referring to FIG. 2A, the power supply apparatus can be equipped with a capacitive divider connected in parallel with the current path comprising the transformer T11, the capacitor C1 and the secondary winding S12 of the output transformer T12 of the power oscillator L01. The capacitive divider comprises a lower potential capacitor C51 and an upper potential capacitor C52 connected to extend from the high-voltage potential to the low-voltage potential. Instead of returning through the line-to-ground capacitance, the current from the power oscillator can now return through the capacitors making up the capacitive divider.

Figure 3:
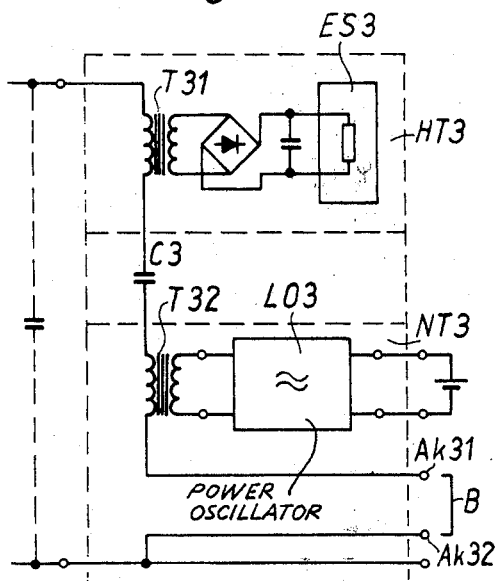
FIG. 3 is an embodiment of the invention wherein the power supply apparatus is equipped with terminals to which a capacitor with a voltage measuring unit is connectable.

FIG. 3 illustrates still another embodiment of the power supply according to the invention. As in the embodiments according to FIGS. 1, 2 and 2A, a high-voltage unit HT3 and a low-voltage unit NT3 are provided and connected with each other through a capacitor C3. The supply of power for an electronic circuit ES3 in the high-voltage unit HT3 is assured by a power oscillator L03 via the transformers T31 and T32. The power supply according to FIG. 3 differs from the embodiment of FIG. 2 only by the feature that the terminals Ak31 and Ak32 are brought out where they can be short-circuited by a jumper B if required, or if a voltage measurement is desired, these terminals can be connected with an additional capacitor, which with the capacitor C3 forms a capacitive voltage divider. In this manner the capacitor C22 according to FIG. 2 is not needed when a voltage measurement is to be made.

Figure 4:
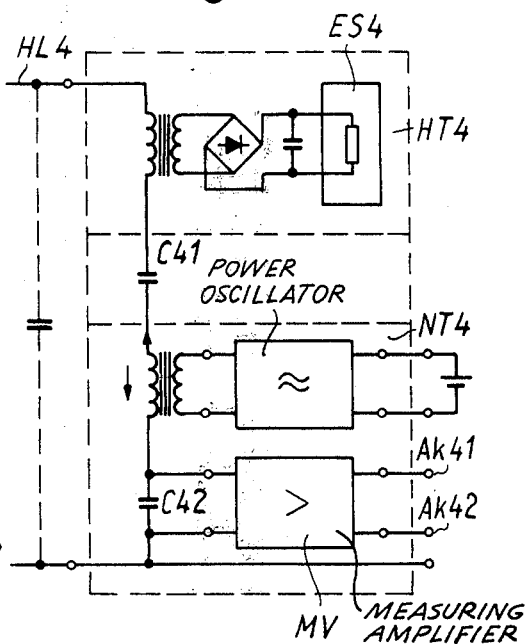
FIG. 4 shows a power supply apparatus equipped with a lower potential capacitor and a measuring amplifier.

In the embodiment of the power supply shown in FIG. 4, a high-voltage unit HT4 is configured exactly as the embodiments described above and is connected in the same manner with a low-voltage unit NT4 through a capacitor C41. The low-voltage unit NT4, however, differs from the low-voltage units of the embodiments described above, inasmuch as a further capacitor C42 is provided as a permanent low-potential capacitor to which a measuring amplifier MV is connected. The output terminals of the measuring amplifier MV are connected to the external terminals Ak41 and Ak42 and a conventional voltage measuring device can be connected to the terminals Ak41 and Ak42. The voltage at the high-voltage conductor HL4 can then be determined. If the electronic circuit ES4 in the high-voltage unit HT4 is configured for measuring the current in the high-voltage conductor HL4 and, if in the low-voltage unit NT4, a device for receiving and evaluating the measurement values determined in the high-voltage unit is provided, a combined current and voltage transformer can be obtained with the power supply according to the invention. Electronic circuits for measuring the current in high-voltage conductors are described, for example, in German Pat. Nos. 1,264,606; 1,283,364 and 1,286,633.

The power supply of the invention supplies electronic circuits at high-voltage potential and assures the supply of power independently of the state of energization at the high-voltage potential. The power supply is at the same time inexpensive and reliable because it requires only relatively few circuit components for bridging the potential difference.

Figure 5:
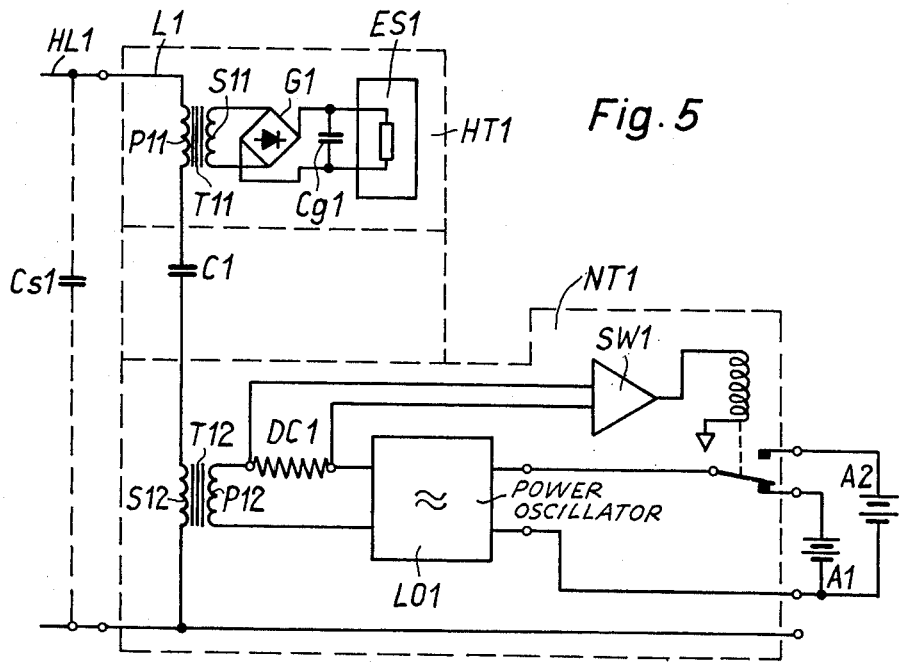
FIG. 5 is a schematic circuit diagram showing the power supply apparatus equipped with a circuit unit in the output current circuit of the power oscillator for monitoring the current generated by the power oscillator.

FIG. 5 illustrates the power supply apparatus of FIG. 1 equipped with circuit means in the form of a current sensitive detection circuit DC1 for monitoring the current in the output circuit of the power oscillator L01. The detection circuit DC1 issues a signal if the current required for supplying the electronic circuit ES1 at high-voltage potential drops below a minimum value. Appropriate circuit means can be connected to the detection circuit DC1 for issuing an optical or acoustical signal for attracting the attention of operating personnel. Or, if desired, an additional storage battery can be provided with a suitable switching circuit SW1. The switching circuit SW1 becomes activated in response to a signal from the detection circuit DC1 and disconnects the storage battery A1 while simultaneously connecting the storage battery A2.

Figure 6:
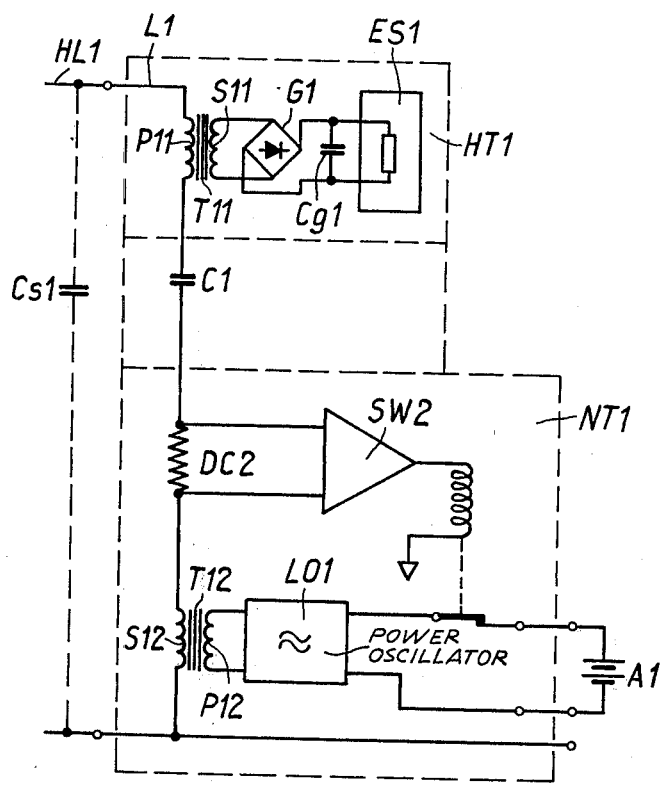
FIG. 6 is a schematic circuit diagram showing the circuit unit for monitoring current connected in the current path between the high-voltage potential and the low-voltage potential.

In FIG. 6 is illustrated another embodiment of the power supply apparatus of FIG. 1 wherein the current supplied to the electronic circuit at high-voltage potential is monitored. Here, limit circuit means in the form of a current sensitive detection circuit DC2 is connected to the circuit which conducts current from the power supply oscillator L01 to the electronic circuit ES1. When the current supplied to the electronic circuit ES1 exceeds a minimal value required by the same, the detection circuit DC2 issues a turn-off signal to a turn-off switching circuit SW2 which disconnects the oscillator from the storage battery A1 in response to this signal.

What is claimed is:
1. Power supply apparatus for supplying power from a low-voltage reference potential to an electronic circuit operable with respect to a high-voltage potential such as an electronic circuit for detecting the current in a high-voltage conductor and the like, the electronic circuit being connected to an associated transformer for receiving electric energy, the apparatus comprising a power oscillator operable with respect to the low-voltage potential and having an output transformer, current path means for conducting electric power from said output transformer of said oscillator at low-voltage potential to the associated transformer connected to the electronic circuit, and power source means for supplying electric power to said power oscillator independently of the value of the electrical energy at the high-voltage potential.

2. The power supply apparatus of claim 1, said current path means comprising an input winding forming part of the associated transformer connected to the electronic circuit, an impedance arrangement serially connected to said input winding, and an output winding forming part of said output transformer of said power oscillator, said output winding being connected to the serial combination of said input winding and said impedance arrangement.

3. Power supply apparatus for supplying power from a low-voltage reference potential to an electronic circuit operable with respect to a high-voltage potential such as an electronic circuit for detecting the current in a high-voltage conductor and the like, the apparatus comprising a power oscillator operable with respect to the low-voltage reference potential and having an output transformer, said transformer having a secondary winding, an associated transformer at the high-voltage potential, said associated transformer having a primary winding and having a secondary winding connectable to the electronic circuit, an impedance arrangement seriallly connected to said primary winding of said associated transformer and to said secondary winding of said output transformer so as to conjointly define a series current path therewith extending between the high-voltage potential and the low-voltage reference potential, and power source means for supplying electric power to said power oscillator independently of the value of energy at the high-voltage potential whereby said power oscillator in turn supplies power through said output transformer, said impedance arrangement, and said associated transformer to the electronic circuit independent of the voltage and current conditions on the high-voltage current conductor.

4. The power supply of claim 3, said power oscillator being configured to generate a current having a frequency of 20 kHz and higher.

5. The power supply of claim 4, said power oscillator being configured to generate a current having a frequency in range from 20 kHz to 75 kHz.

6. The power supply of claim 3, said impedance arrangement comprising a capacitor arranged intermediate said secondary winding of said output transformer and said primary winding of said associated transformer.

7. The power supply apparatus of claim 6, said current path means comprising an additional capacitor connected in series with said secondary winding of said output transformer so as to define a series circuit including said additional capacitor, said secondary winding, said first-mentioned capacitor and said primary winding, said first-mentioned capacitor and said additional capacitor being upper potential and lower potential capacitors respectively, said upper potential capacitor and said lower potential capacitor defining a capacitive divider.

8. The power supply apparatus of claim 7 wherein provision is made for making voltage measurements, said lower potential capacitor having terminals at respective ends thereof, and a measuring amplifier connected to said terminals, said amplifier in turn having output terminals to which a voltage measuring instrument is connectable.

9. The power supply apparatus of claim 7 comprising a structure for containing said power oscillator and said lower potential capacitor, said lower potential capacitor having terminals at respective ends thereof, said terminals being brought to the outside of said structure for facilitating access thereto.

10. The power supply apparatus of claim 7, said associated transformer, said oscillator, said capacitors, and the electronic circuit at high-voltage potential being configured to form a composite unit.

11. The power supply apparatus of claim 3 comprising a capacitive divider connected in parallel with said current path means and between the low-voltage potential and the high-voltage potential, said capacitive divider comprising an upper potential capacitor, and a lower potential capacitor connected in series with said upper potential capacitor.

12. The power supply apparatus of claim 3 wherein said power oscillator has an output circuit connecting said oscillator with the primary of said output transformer, and wherein said apparatus comprises circuit means connected in said output circuit for monitoring the current generated by said oscillator to generate a signal in response to a drop in current below a minimal value required by the electronic circuit at the high-voltage potential.

13. The power supply apparatus of claim 3, said current path means comprising limit circuit means connected to the circuit containing said serial combination and said secondary winding of said output transformer for generating a turn-off signal for said oscillator in response to an increase in the current in said circuit above a minimal value required by the electronic circuit at the high-voltage potential.

14. The power supply apparatus of claim 3, said apparatus and the electronic circuit at high-voltage potential being configured to form a composite unit.

* * * * *